May 16, 1950 H. E. LEE Re. 23,230

VALVE BAG

Original Filed Nov. 12, 1940

INVENTOR.
HARRY E. LEE.
BY
ward Crosby & neal
ATTORNEYS.

Reissued May 16, 1950

Re. 23,230

UNITED STATES PATENT OFFICE 23,230

VALVE BAG

Harry E. Lee, Oswego, N. Y., assignor to St. Regis Paper Company, New York, N. Y., a corporation of New York Original No. 2,478,113, dated August 2, 1949, Serial No. 619,149, September 28, 1945. Application for reissue January 27, 1950, Serial No. 140,940

3 Claims. (Cl. 229—62.5)

Matter enclosed in heavy brackets [ ] appears in the original patent but forms no part of this reissue specification; matter printed in italics indicates the additions made by reissue This invention relates to multi-ply bags and, more particularly, to bags wherein one corner is folded in to form a valve.

An important feature of the invention resides in extending at least one ply of the bag inwardly beyond the inner edge of the remaining plies of the valve, thereby forming an integral flexible valve extension which is pushed upwardly against the bag walls, when the bag is filled, by the pressure of the material within the bag, to thereby seal the valve opening and prevent material from sifting out therethrough. Preferably, this valve extension should be formed on an intermediate ply of the bag since, if the outer ply is extended, then in the process of manufacturing the bag lengths from a continuous tube with a minimum of wastage, an exposed area of the outer ply of one bag length would have to be cut away to provide the area of material for the extended ply of the next adjacent bag length, and of course such a gap or cut out area in the outer ply would be undesirable. Also, if the inner ply were extended, a similar gap or cut out area would occur in the inner ply of the adjacent bag length and would permit material to leak from the inside of the bag into the space between the plies. With the intermediate ply extended, the corresponding cut out area on the next adjacent tube length, will be concealed by the inner and outer plies. However, with some types of bags, such for example as pasted bags, the extension may advantageously be formed on the inner or outer ply especially if such extension is comparatively short with respect to the depth of the valve.

According to the invention, the integral valve extension is preferably of beveled or tapered configuration when it is spread out in a plane, with the tapered portion directed inwardly of the valve. When a valve extension is formed on a gusseted bag, slits may advantageously be formed in the extension along the fold lines which define the gusset of the bag, these slits permitting the bag to be readily filled by material forced through a filling spout and thence passing through the lower slitted portion of the extension into the bag. Such slits are further advantageous in facilitating closure of the valve after the bag has been filled since they permit the flexible portions of the extension to readily overlap without wrinkles and thus seal the bag.

Various further and more specific objects, features and advantages of the invention will appear from the description given below taken in connection with the accompanying drawings illustrating, by way of example, a preferred form of the invention. The invention consists in such novel features and combinations as may be shown and described in connection with the example of the invention herein disclosed.

Figure 1:
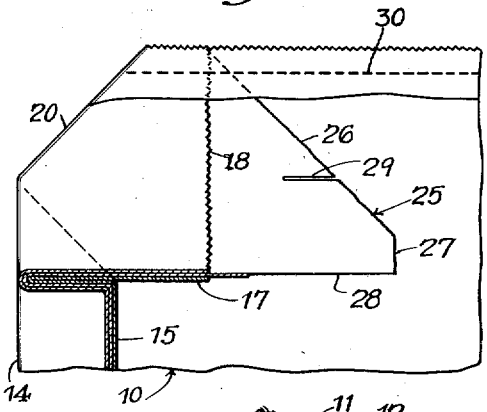
Fig. 1 is a sectional view, with portions of the bag walls broken away, showing the construction of the novel valve bag.
Figure 2:
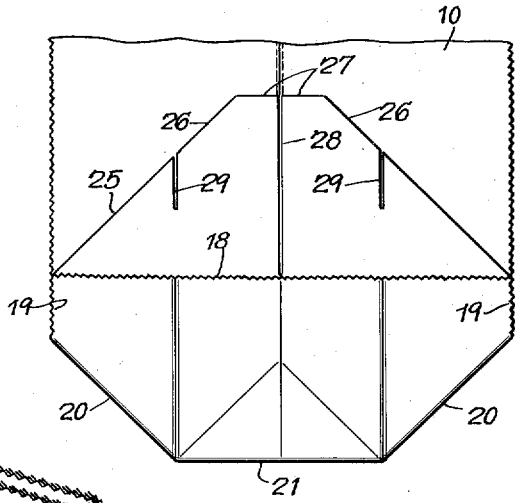
Fig. 2 is a view of the valve extension with the bag walls spread apart.

Referring to the drawings in further detail, a three ply bag is shown at 10 as being formed from outer, intermediate and inner plies 11, 12 and 13. Although a three ply bag is shown for purposes of illustration, it will be understood that any desired number of plies may be utilized. Each side of the bag may, if desired, be folded inwardly along fold lines 14, 15 and 16 to form a gusset and the upper corner of the bag may be folded inwardly to form a valve, the side walls of which are integrally joined along a lower crease line 17. The inner and outer plies of the valve may extend inwardly of the bag to the lines 18 which define the conventional inner edge of the valve, and the edges 18 may be substantially parallel to the edge surfaces 14 and 16 of the bag. The upper part of the valve may be defined by the wall portions 19 and the diagonal fold lines 20 where the valve is integrally joined to the bag walls. Below the lines 20, the valve walls may merge as at 21 toward the bottom fold line 17. It will be apparent that the valve walls are of generally V-shaped cross section when the bag is empty and in collapsed position.

According to the invention, the middle ply 12 may extend inwardly as at 25 beyond the conventional inner edges 18 to thereby form a flexible integral extension of the valve. This extension may be tapered as at 26 with such tapered portions merging into the inner end portions 27 of the extension which are preferably substantially parallel to the aforesaid inner edges 18. The bottom of the extension may be slitted as at 28 to allow material readily to be discharged, in the usual manner, from a filling spout inserted into the valve to thereby fill the bag. The extension may also be slitted as at 28 such slits being formed along the gusset fold lines 14, 15 and 16 before the bag corner is folded inwardly to form the valve.

It will be understood that, after the bag is filled, the material within the bag presses the valve walls and the extension upwardly to seal the bag and prevent the contents thereof from leaking out through the valve. In this connection, the slits 28, 29 are advantageous in that they permit the flexible portions of the valve extension to overlap without wrinkles whereby a more effective seal and closure is obtained.

Figure 3:
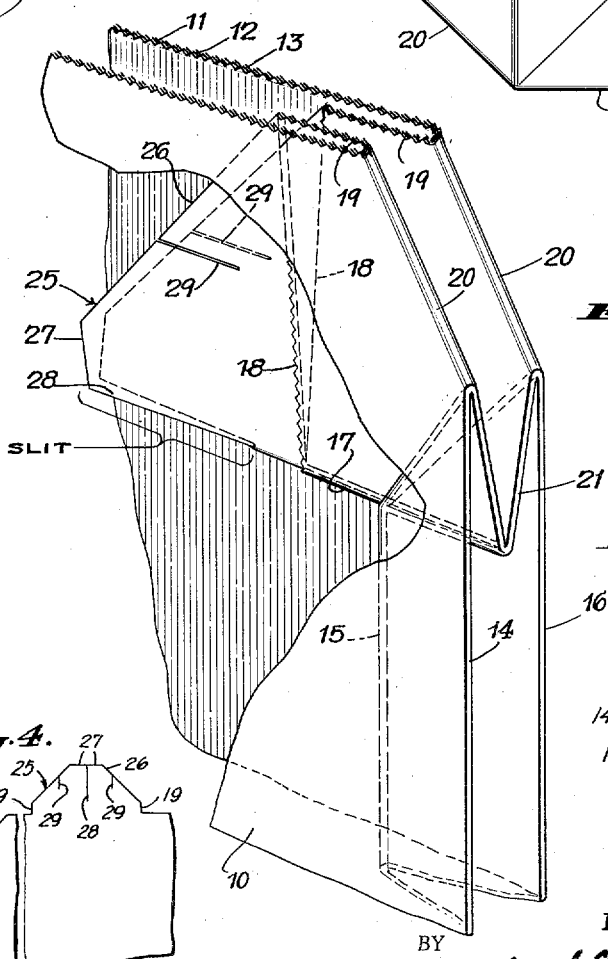
Fig. 3 is a perspective view of the novel valve bag of the invention.
Figure 5:
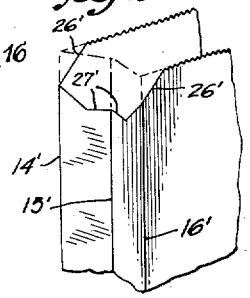
Fig. 5 is a perspective view showing the shape of such intermediate ply at the region of the top corner of the bag opposite from the valve corner.
Figure 4:
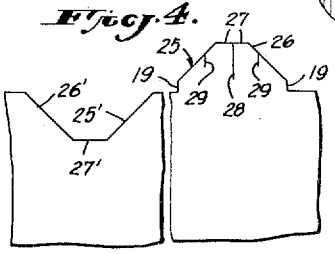
Fig. 4 is a developed view of edge portions of the intermediate ply of the bag tube as cut in accordance with the invention.

Methods for forming the novel valve bag of this invention are described and claimed in U. S. Patent No. 2,392,094, granted January 1, 1946, on my copending divisional application Ser. No. 365,233. As indicated hereinabove, and in said copending application, such methods in general may comprise forming the multi-ply bag lengths from a continuous multiwall tube, in such manner that the extended flexible valve flap of the intermediate ply is cut from the edge of the intermediate ply of the next adjacent bag to be cut from the continuous tube. Thus, as disclosed in said patent, at the top corner of the bag, opposite from the valve corner, an area of the intermediate ply is cut out to provide the material for the extension flap of the next bag, such area being of the same outline or at least as extensive as the valve extension flap. This is shown in Fig. 4, which is a developed view partly broken away, of the extended and cut-out edge portions of the intermediate ply. In the righthand portion of this figure the parts are identified with the same reference characters as for corresponding parts in Fig. 3. At the lefthand side of this figure the various corresponding parts of the outline of the cut-out portion at the top corner of the bag opposite from the valve corner are also identified by the same reference numerals accompanied by prime marks. In the perspective view of Fig. 5 the shape of the intermediate ply at the top corner of the bag opposite from the valve corner is shown, this figure indicating the relative positions which the various portions of the outline of the cut-out portion will assume. The positions which will be assumed by the creases and edges of the inner and outer plies at this corner are indicated by dotted lines in Fig 5. It will be understood that the cut-out area of the intermediate ply will be fully covered by the inner and outer plies so that there will be no oportunity for sifting of the bag contents down between the plies due to there being a cut-out area in the intermediate ply. Such cut-out area not only provides the material for the valve extension flap of the next adjacent bag, but also has the advantage important in some cases, of eliminating four thicknesses of paper at this gusseted top corner so that the corner is made more flexible and thus does not so rigidly protrude as to tend to cause cracking of the paper adjacent the corner when the corner is jammed during rough handling of the bag.

It will be obvious from the foregoing description that the size and shape of the valve extension may be varied without departing from the scope of the invention and that such an extension may be formed on more than one ply of the bag, if desired. Moreover, the construction and arrangement of the slits may be changed and, in some cases, particularly in pasted bags, they may be omitted altogether. According to another aspect of the invention, the non-extended plies of the valve portions 19 may be made shorter or even omitted entirely so that the inner valve flap edges 18 form straight line continuations of the top edges of the bag before the valve is tucked in. The bag may be closed in any suitable manner and this is preferably done by applying a line of stitching as at 30, Fig. 1, to the open end of the bag.

While the invention has been described in detail with respect to a particular preferred example, it will be understood by those skilled in the art after understanding the invention that various changes and modifications may be made without departing from the spirit and scope of the invention, and it is intended therefore in the appended claims to cover all such changes and modifications.

What is claimed as new and desired to be secured by Letters Patent is:

1. A multi-ply valve bag having its body portion formed of at least three flattened tubes gusseted at their sides and including an inner tube surrounded by an intermediate tube and an outer tube, the top corner portion of the intermediate tube at the valve corner extending substantially beyond the inner and outer tubes and such corner being folded inwardly of the bag to form a valve with the extension of the intermediate tube providing a flexible valve flap extension adapted to be pressed up against the inside top portion of the bag by the contents of the bag when filled to check sifting of such contents through the valve, the intermediate tube at the top corner opposite from the valve corner being formed with a cut-out gusset area extending down from its upper edge, such area corresponding in extent to that of said flap extension and being covered internally and externally of the bag by the inner and outer tube walls.

2. A multi-ply valve bag having its body portion formed of at least three flattened tubes gusseted at their sides and including an inner tube surrounded by an intermediate tube and an outer tube, the top corner portion of the intermediate tube at the valve corner extending substantially beyond the inner and outer tubes and such corner being folded inwardly of the bag to form a valve with the extension of the intermediate tube providing a flexible valve flap extension adapted to be pressed up against the inside top portion of the bag by the contents of the bag when filled to check sifting of such contents through the valve, the intermediate tube at a corner on the side of the bag opposite from the valve corner being formed with a cut-out gusset area extending from its end edge, such area substantially corresponding in extent to that of said flap extension and being covered internally and externally of the bag by the inner and outer tube walls.

*3. A multi-ply valve bag having its body portion formed of at least three flattened tubes, including an inner tube surrounded by an intermediate tube and an outer tube, the tube ends being secured together to close the bag, the top corner portion of the intermediate tube at the valve corner extending substantially beyond the inner and outer tubes and such corner being folded inwardly of the bag to form a valve with the extension of the intermediate tube providing a flexible valve flap extension adapted to be pressed up against the inside top portion of the bag by the contents of the bag when filled to check sifting of such contents through the valve, the intermediate tube at another corner being formed with a cut-out area extending from its end edge, such area substantially corresponding in extent to that of said*

*flap extension and being covered internally and externally of the bag by the end portions of the inner and outer tube walls.*

HARRY E. LEE.

REFERENCES CITED

The following references are of record in the file of this patent or the original patent:

UNITED STATES PATENTS

| Number | Name | Date |
|---|---|---|
| 1,957,839 | Lee | May 8, 1934 |
| 2,176,499 | Hoppe et al. | Oct. 17, 1939 |
| 2,232,497 | Tooker | Feb. 18, 1941 |
| 2,346,292 | Coty | Apr. 11, 1944 |
| 2,347,673 | Doyle | May 2, 1944 |
| 2,378,285 | Contryman | June 12, 1945 |